United States Patent
Balmakhtar et al.

(10) Patent No.: US 12,418,793 B2
(45) Date of Patent: Sep. 16, 2025

(54) WIRELESS DATA SERVICE USING CONTENT-ADDRESSING

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 169 days.

(21) Appl. No.: 18/479,475

(22) Filed: Oct. 2, 2023

(65) Prior Publication Data

US 2025/0113183 A1  Apr. 3, 2025

(51) Int. Cl.
*H04L 9/00* (2022.01)
*H04L 29/08* (2006.01)
*H04W 12/033* (2021.01)
*H04W 48/16* (2009.01)

(52) U.S. Cl.
CPC ......... *H04W 12/033* (2021.01); *H04W 48/16* (2013.01)

(58) Field of Classification Search
CPC .............................. H04W 12/033; H04W 48/16
USPC ......................................................... 380/270
See application file for complete search history.

(56) References Cited

U.S. PATENT DOCUMENTS

| | | | |
|---|---|---|---|
| 10,491,378 B2 | 11/2019 | Binning et al. | |
| 10,938,896 B2 | 3/2021 | Waffner | |
| 11,115,312 B1 * | 9/2021 | Hankins | ................... H04L 67/06 |
| 12,231,574 B2 * | 2/2025 | Wright | ................ G06F 16/2379 |

(Continued)

FOREIGN PATENT DOCUMENTS

| | | | | |
|---|---|---|---|---|
| CN | 114866323 B | 8/2022 | | |
| WO | WO-2021136696 A1 * | 7/2021 | ........ | H04W 36/0061 |
| WO | 2023172729 A1 | 9/2023 | | |

OTHER PUBLICATIONS

Huang, et al.; "A Secure File Sharing System Based on IPFS and Blockchain"; arxiv.org; May 2, 2022; 5 pages; https://arxiv.org/abs/2205.01728.

*Primary Examiner* — Haresh N Patel (57) ABSTRACT

A wireless communication system delivers a wireless data service to a wireless communication device using content-addressing. The wireless communication system generates a content-address from a data set. The wireless communication system stores the content-address in association with the data set. The wireless communication system encrypts the content-address with a system key and transfers the encrypted content-address to the wireless communication device. The wireless communication device decrypts the encrypted content-address with a user key to obtain the content address. The wireless communication device re-encrypts the content-address with the user key. The wireless communication system receives the re-encrypted content-address from the wireless communication device and decrypts the re-encrypted content-address with the system key to obtain the content-address. The wireless communication system retrieves the data set from the memory circuitry with the decrypted content-address. The wireless communication system delivers the wireless data service to the wireless communication device based on the retrieved data set.

20 Claims, 10 Drawing Sheets

(56) References Cited

U.S. PATENT DOCUMENTS

| | | | |
|---|---|---|---|
| 2021/0119785 A1 | 4/2021 | Ben-Reuven et al. | |
| 2021/0176054 A1* | 6/2021 | Zabar | H04L 9/0894 |
| 2021/0367877 A1* | 11/2021 | Hankins | H04L 45/033 |
| 2022/0131691 A1* | 4/2022 | Gupta | H04L 9/3265 |
| 2022/0303181 A1 | 9/2022 | Nolan et al. | |
| 2022/0407725 A1 | 12/2022 | Chai et al. | |
| 2023/0100342 A1 | 3/2023 | Smith et al. | |
| 2023/0110131 A1 | 4/2023 | Smith et al. | |
| 2023/0239166 A1* | 7/2023 | Cheng | G06F 21/6218 |
| | | | 713/165 |
| 2023/0267156 A1* | 8/2023 | Goel | G06F 16/9532 |
| | | | 707/709 |
| 2023/0292124 A1 | 9/2023 | Balmakhtar et al. | |
| 2023/0370275 A1* | 11/2023 | Aspler-Yaskil | H04L 9/50 |
| 2023/0379180 A1* | 11/2023 | Khaykovich | H04L 9/50 |
| 2024/0013210 A1* | 1/2024 | Wilkinson | G06Q 20/389 |
| 2024/0086382 A1* | 3/2024 | Soon-Shiong | G06F 16/22 |
| 2024/0265001 A1* | 8/2024 | Fatahi | G06F 16/27 |
| 2025/0113183 A1* | 4/2025 | Balmakhtar | H04W 48/16 |

\* cited by examiner

WIRELESS DATA SERVICE USING CONTENT-ADDRESSING

TECHNICAL BACKGROUND

Wireless communication networks provide wireless data services to wireless communication devices like phones, computers, and other user devices. The wireless data services may include internet-access, data messaging, video conferencing, or some other data communication functionality. The wireless communication networks comprise wireless access nodes like Wireless Fidelity (WIFI) hotspots and Fifth Generation New Radio (5GNR) cell towers. The wireless communication networks also comprise network slices. The network slices have customized software that is tailored for their specific wireless data services. For example, an augmented reality device may use an Ultra-Reliable Low Latency Communication (URLLC) slice while a television may use an enhanced Mobile Broadband (eMBB) slice.

Before a wireless network slice delivers a wireless data services to a wireless communication device, the wireless communication network and the wireless communication device, the network and the user device engage in an authentication process and a slice selection procedure. The authorization process typically requires the network and the user device to hash a user identity and a random number and then the network matches the two hashes to authenticate the user device. The slice selection process typically requires the user device to submit a slice type and the network to interact among multiple network elements to select and authorize a slice for the user device based on the slice type. The current authentication process and selection procedure for a wireless communication device to use wireless network slice is cumbersome.

Distributed ledgers have multiple ledger nodes that perform ledger transactions in parallel. The ledger nodes validate a transaction when a consensus is reached among the nodes for the ledger transaction. The typical ledger transaction entails a smart contract that processes a data input to generate a data-output. For example, a ledger may process the data inputs of a current balance and an expenditure to generate the data output of a new balance. The distributed ledger nodes each store transaction data in data blocks that also include a hash of the previous data block. Thus, the data blocks are linked by the hashes and the transaction data is immutable.

Content-addressable storage is a way to store data sets so they can be retrieved based on their content. In a content-addressable system, the content of a data set is processed through a cryptographic hash function to generate a unique content identifier-sometimes called a content address. The data file is stored in association with the content identifier. The content identifier is then used to request and retrieve the data set. As long as the content of the data set remains the same, the content identifier also remains the same and can be used to access the file. When the content of the data set changes, a new content identifier is generated based on the changed data set. The data sets in a content-addressing system are typically distributed across multiple system nodes. The content-addresses are able to obtain a desired data set from any of the nodes. A popular form of content-addressing is Inter-Planetary File System (IPFS).

Unfortunately, the wireless communication networks require cumbersome authentication processes and slice selection procedures to allow secure user access to their network slices and other data services. Moreover, the wireless communication networks fail to use distributed ledgers and content-addressing in an efficient and effective manner to allow secure user access to their network slices other data services.

Technical Overview

In some examples, a wireless data service is delivered to a wireless communication device using content-addressing. A content-address is generated from a data set and stored in association with the data set. The content-address is encrypted with a system key and transferred to the wireless communication device. The wireless communication device decrypts the encrypted content-address with a user key to obtain the content address. The wireless communication device re-encrypts the content-address with the user key. The re-encrypted content-address is received from the wireless communication device and decrypted with the system key to obtain the content-address. The data set is retrieved with the decrypted content-address. The wireless data service is delivered to the wireless communication device based on the retrieved data set.

In some examples, a wireless data service is delivered to a wireless communication device using an Inter-Planetary File System Identifier (IPFS ID). The IPFS ID is a content address that is generated from content that comprises wireless network slice information. The IPFS ID is stored in association with the wireless network slice information. The IPFS ID is encrypted with a system key and is transferred to the wireless communication device. The wireless communication device decrypts the encrypted IPFS ID with a user key to obtain the IPFS ID. The wireless communication device encrypts the IPFS ID with the user key. The re-encrypted IPFS ID is received from the wireless communication device and decrypted with the system key to obtain the IPFS ID. The wireless network slice information is retrieved with the decrypted IPFS ID. The wireless data service is delivered to the wireless communication device based on the retrieved wireless network slice information.

In some examples, a wireless data service is delivered to a wireless communication device using content-addressing. Processing circuitry generates a content-address from a data set. Memory circuitry stores the content-address in association with the data set. The processing circuitry encrypts the content-address with a system key and transfers the encrypted content-address to the wireless communication device. The wireless communication device decrypts the encrypted content-address with a user key to obtain the content address. The wireless communication device re-encrypts the content-address with the user key. The processing circuitry receives the re-encrypted content-address from the wireless communication device and decrypts the re-encrypted content-address with the system key to obtain the content-address. The processing circuitry retrieves the data set from the memory circuitry with the decrypted content-address. Communication circuitry delivers the wireless data service to the wireless communication device based on the retrieved data set.

DETAILED DESCRIPTION

Figure 1:
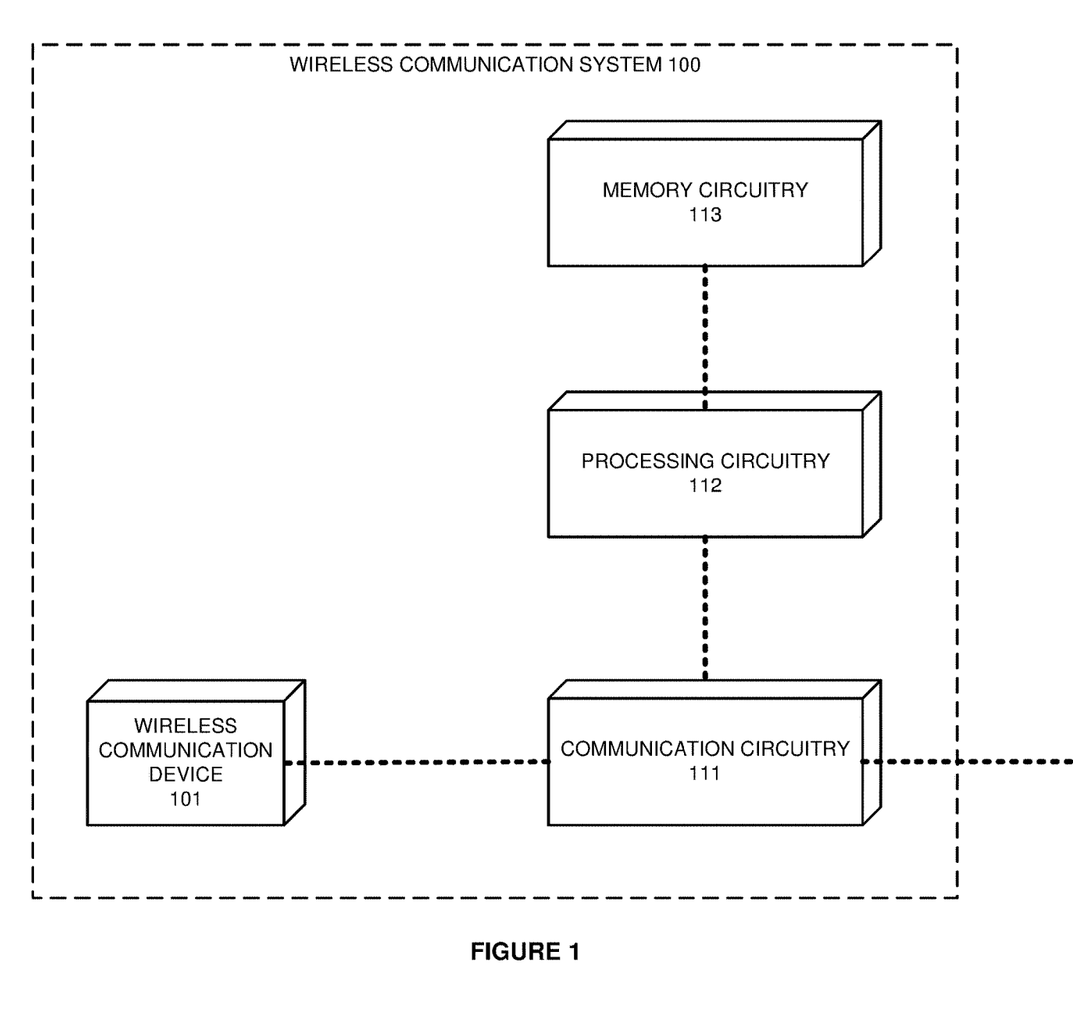
FIG. 1 illustrates an exemplary wireless communication system to deliver a wireless data service to a wireless communication device using content-addressing.

FIG. 1 illustrates exemplary wireless communication system 100 to deliver a wireless data service to wireless communication device 101 using content-addressing. Wireless communication system 100 comprises wireless communication device 101, communication circuitry 111, processing circuitry 112, and memory circuitry 113. Wireless communication system 100 serves wireless data services to wireless communication device 101 like internet-access, data messaging, media conferencing, or some other data communications product. The amount of wireless communication devices that are shown in FIG. 1 has been restricted for clarity.

Wireless communication system 100 delivers the wireless data service to wireless communication device 101 using content-addressing. Processing circuitry 112 generates a content-address from a data set. For example, processing circuitry 112 may generate an Inter-Planetary File System Identifier (IPFS ID) from wireless network slice information. Processing circuitry 112 stores the content-address in association with the data set in memory circuitry 113. Processing circuitry 112 encrypts the content-address with a system key. Processing circuitry 112 transfers the encrypted content-address to wireless communication device 101 over communication circuitry 111. Wireless communication device 101 decrypts the encrypted content-address with a user key to obtain the content address.

When the wireless data service is needed, wireless communication device 101 re-encrypts the content-address with the user key. Processing circuitry 112 receives a re-encrypted content-address from wireless communication device 101 over communication circuitry 111. Processing circuitry 112 decrypts the re-encrypted content-address with the system key to obtain the content-address. Processing circuitry 112 retrieves the data set from memory circuitry 113 using the decrypted content-address. Communication circuitry 111 delivers the wireless data service to wireless communication device 101 based on the retrieved data set. For example, communication circuitry 111 may deliver Ultra-Reliable Low-Latency Communication (URLLC) service to wireless communication device 101 based on a data set that comprises wireless network slice information for the URLLC slice.

The data set may comprise wireless network slice information for the wireless communication service delivered to the wireless communication device. The data set may comprise operating system container properties for the wireless data service delivered to the wireless communication device. Processing circuitry 112 may comprise a smart contract in a distributed ledger that generates the content-address from the data set. Memory circuitry 113 may comprise a distributed ledger that stores the content-address in association with the data set.

Wireless communication device 101 comprises a phone, computer, vehicle, sensor, or some other user communication apparatus. Communication circuitry 111 comprises wireless access nodes, network controllers, data routers, and/or some other wireless communication apparatus. Wireless communication device 101 and communication circuitry 111 comprise one or more radios that wirelessly communicate using wireless protocols like Wireless Fidelity, (WIFI), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite data communications.

Wireless communication device 101 and circuitry 111-113 comprise microprocessors, software, memories, transceivers, bus circuitry, and/or some other data processing components. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of wireless communication system 100 as described herein.

Figure 2:
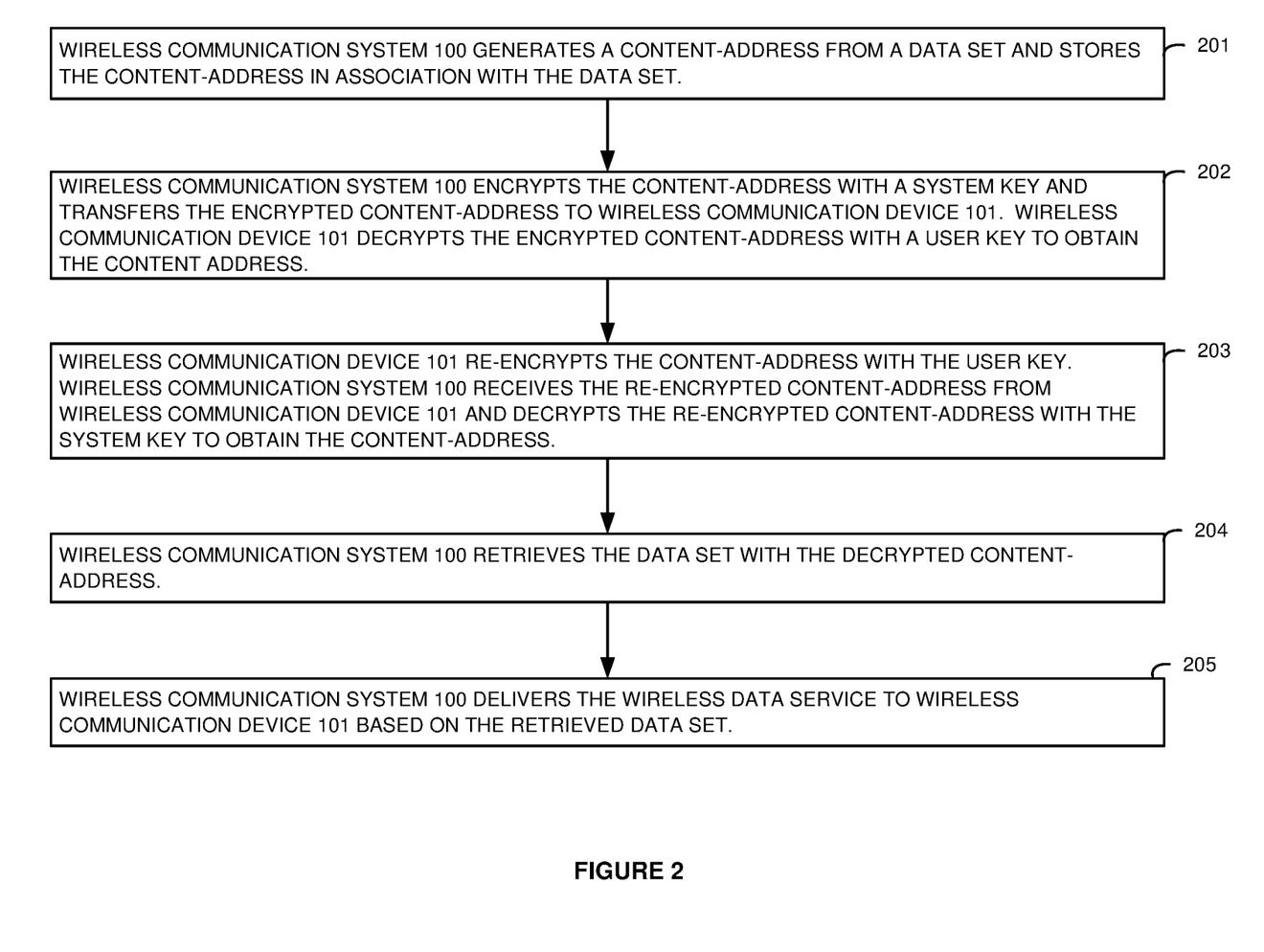
FIG. 2 illustrates an exemplary operation of the wireless communication system to deliver the wireless data service to the wireless communication device using content-addressing.

FIG. 2 illustrates an exemplary operation of wireless communication system 100 to deliver the wireless data service to wireless communication device 101 using content-addressing. The operation may differ in other examples. Wireless communication system 100 generates a content-address from a data set and stores the content-address in association with the data set (201). Wireless communication system 100 encrypts the content-address with a system key and transfers the encrypted content-address to wireless communication device 101 (202). Wireless communication device 101 decrypts the encrypted content-address with a user key to obtain the content address (202). Subsequently, wireless communication device 101 re-encrypts the content-address with the user key (203). Wireless communication system 100 receives a re-encrypted content-address from wireless communication device 101 (203). Wireless communication system 100 decrypts the re-encrypted content-address with the system key to obtain the content-address (204). Wireless communication system 100 retrieves the data set from memory circuitry 113 with the decrypted content-address (204). Wireless communication system 100 delivers the wireless data service to wireless communication device 101 based on the retrieved data set (205).

Figure 3:
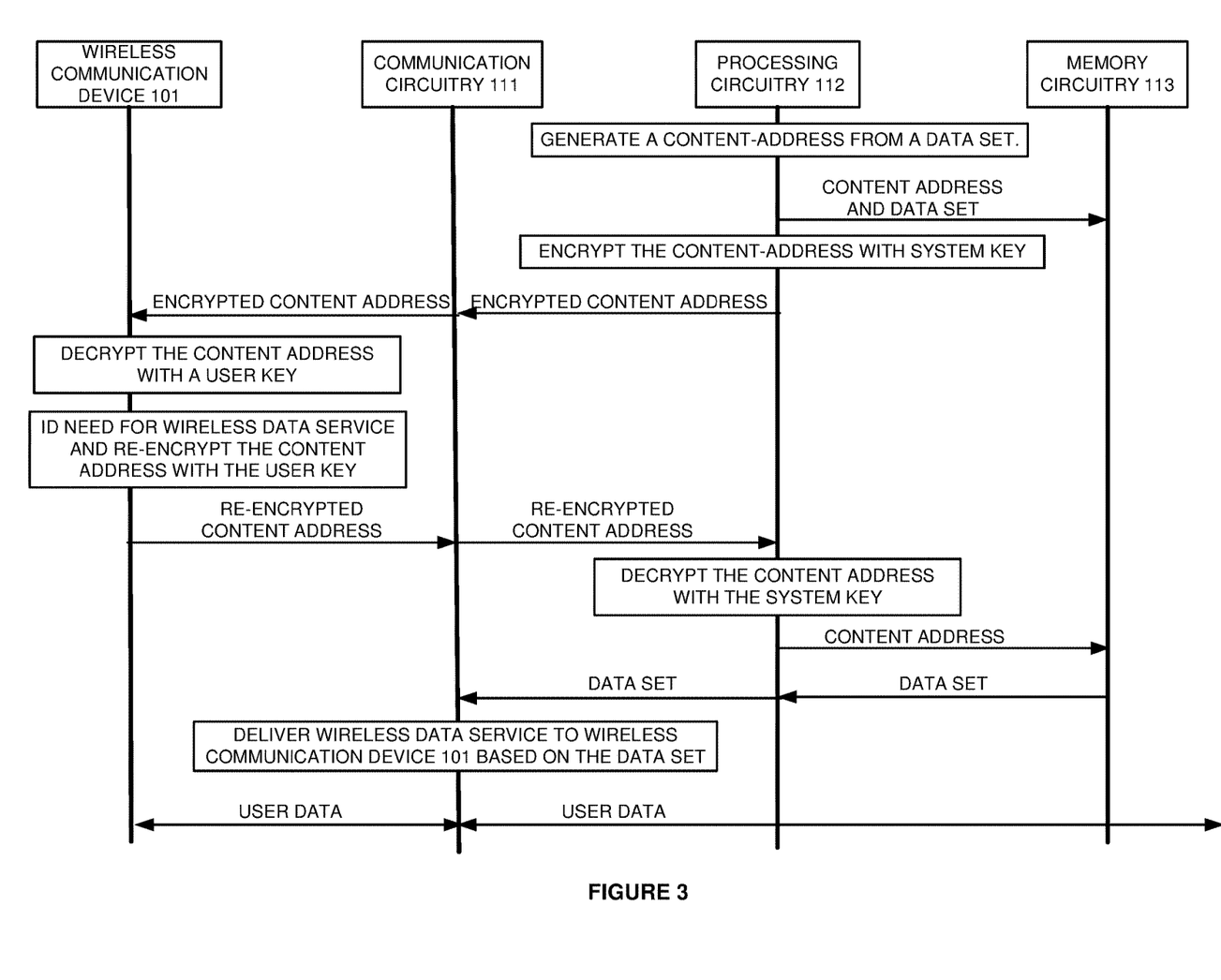
FIG. 3 illustrates an exemplary operation of the wireless communication system to deliver the wireless data service to the wireless communication device using content-addressing.

FIG. 3 illustrates an exemplary operation of wireless communication system 100 to deliver the wireless data service to wireless communication device 101 using content-addressing. The operation may differ in other examples. Processing circuitry 112 generates a content-address from a data set. Processing circuitry 112 stores the content-address in association with the data set in memory circuitry 113. Processing circuitry 112 encrypts the content-address with a system key. Processing circuitry 112 transfers the encrypted content-address to wireless communication device 101 over communication circuitry 111. Wireless communication device 101 decrypts the encrypted content-address with a user key to obtain the content address. Wireless communication device 101 identifies (IDs) the need for the wireless data service, and in response, wireless communication device 101 re-encrypts the content-address with the user key. Processing circuitry 112 receives the re-encrypted content-address from wireless communication device 101 over communication circuitry 111. Processing circuitry 112 decrypts the re-encrypted content-address with the system key to obtain the content-address. Processing circuitry 112 retrieves the data set from memory circuitry 113 using the decrypted content-address. Communication circuitry 111 delivers the wireless data service to wireless communication device 101 based on the retrieved data set by exchanging user data between wireless communication device 101 and an external system (not shown).

Advantageously, wireless communication system 100 avoids cumbersome authentication processes and slice selection procedures to allow secure user access to network slices and other data services. Moreover, wireless communication system 100 can use distributed ledgers and content-addressing in an efficient and effective manner to allow secure user access to the network slices and other data services.

Figure 4:
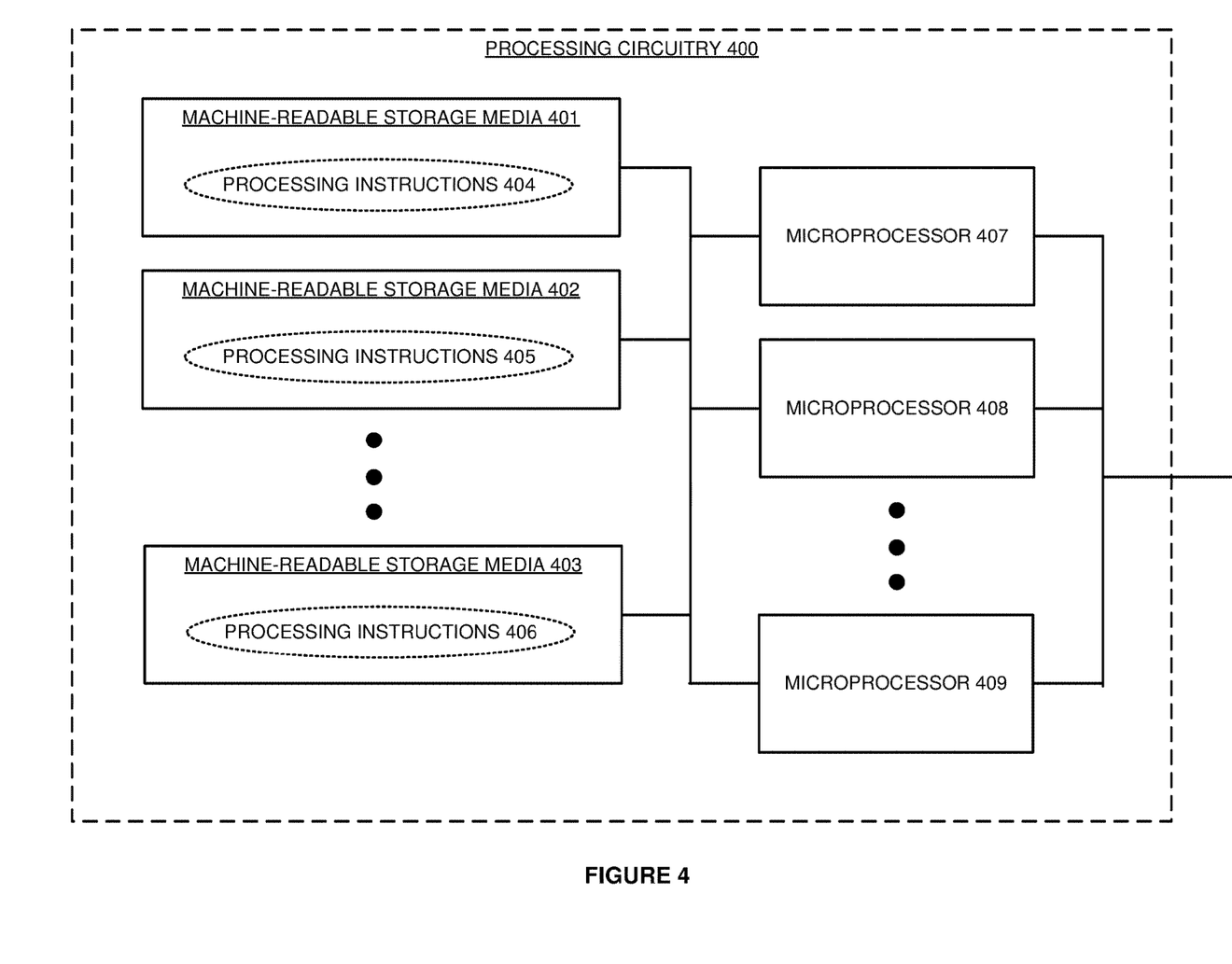
FIG. 4 illustrates exemplary processing circuitry to deliver a wireless data service to a wireless communication device using content-addressing.

FIG. 4 illustrates exemplary processing circuitry 400 to deliver a wireless data service to a wireless communication device using content-addressing. Processing circuitry 400 comprises an example of circuitry 111-113, although circuitry 111-113 may differ. Processing circuitry 400 comprises machine-readable storage media 401-403 and microprocessors 407-409 that are communicatively coupled. Machine-readable storage media 401-403 store processing instructions 404-406 in a non-transitory manner. Microprocessors 407-409 comprise DSPs, CPUs, GPUs, ASICs, and/or some other data processing hardware. Machine-readable storage media 401-403 comprises RAM, flash circuitry, disk drives, and/or some other type of data storage apparatus. Microprocessors 407-409 retrieve processing instructions 404-406 from non-transitory machine-readable storage media 401-403. Microprocessors 407-409 execute processing instructions 404-406 to deliver the wireless data service to the wireless communication device using content-addressing as described above for wireless communication system 100 and as described below for wireless communication network 500. The amount of storage media, microprocessors, processing instructions that are shown in FIG. 4 is exemplary and may vary in other examples.

Figure 5:
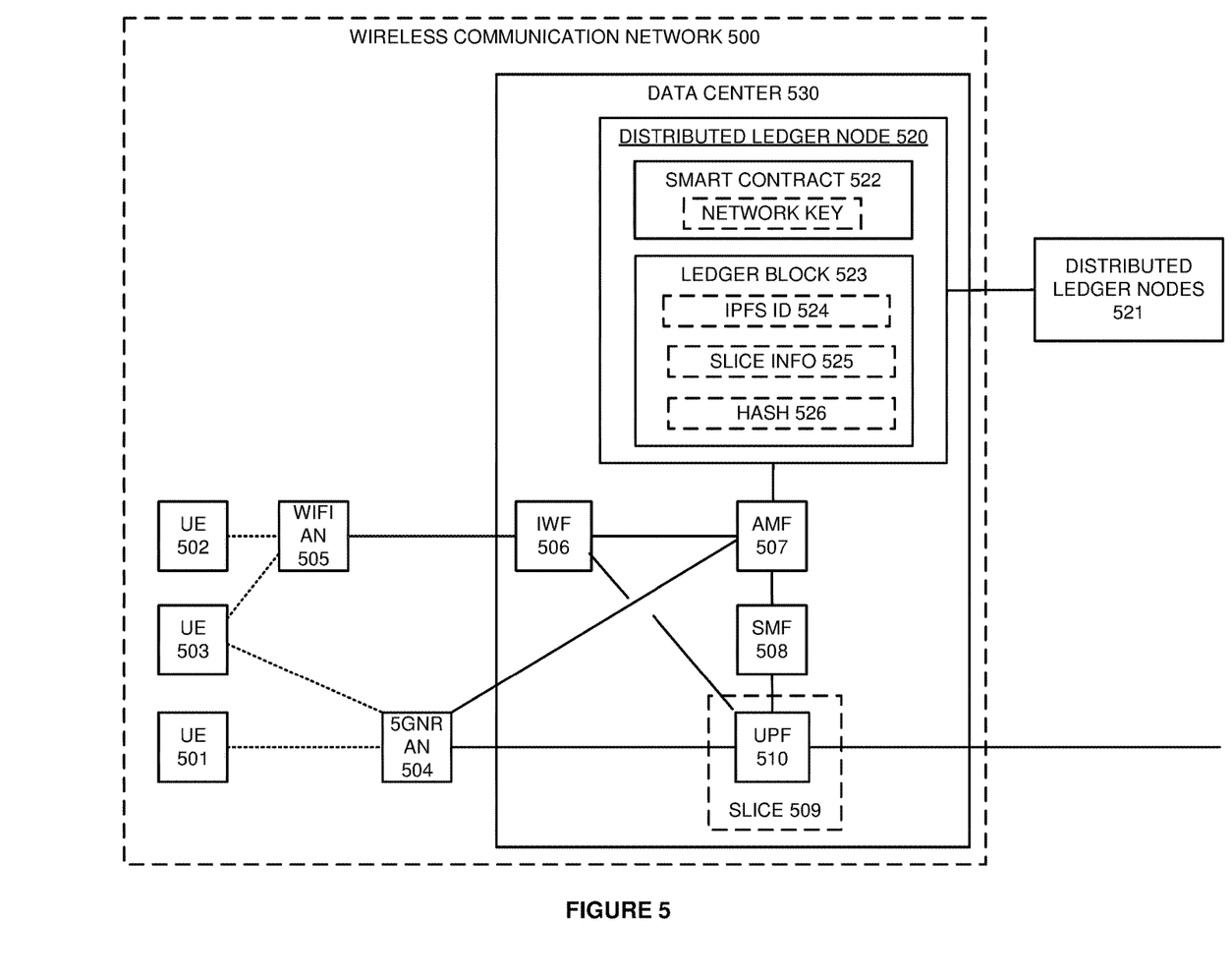
FIG. 5 illustrates an exemplary wireless communication network to deliver a wireless data service to wireless User Equipment (UEs) using Inter-Planetary File System Identifiers (IPFS IDs).

FIG. 5 illustrates exemplary wireless communication network 500 to deliver a wireless data service to wireless User Equipment (UEs) 501-503 using Inter-Planetary File System Identifiers (IPFS IDs). Wireless communication network 500 comprises an example of wireless communication system 100 and processing circuitry 400, although system 100 and circuitry 400 may differ. Wireless communication network 500 comprises UEs 501-503, Fifth Generation New Radio Access Node (5GNR AN) 504, WIFI AN 505, and Data center 530. Data center 530 comprises Non-Third Generation Partnership Project Interworking Function (IWF) 506, Access and Mobility Management Function (AMF) 507, Session Management Function (SMF) 508, slice 509, and distributed ledger node 520. Slice 509 comprises User Plane Function (UPF) 510. Distributed ledger node 520 communicates with other distributer ledger nodes 521 and comprises smart contract 522 and ledger block 523. Ledger block 523 comprises IPFS ID 524, slice information (INFO) 525 and previous block hash 526. Smart contract 522 includes a network key and UE 503 has a UE key (not shown). The network key and the UE key form a private/public key pair that is suitable for cryptography. The amount of UEs, ANs, data centers, slices, and ledger blocks has been restricted for clarity.

In operation, distributed ledger node 520 executes smart contract 522 which has a network key. Smart contract 522 receives slice information 525 for UE 503 from network operations (not shown). Slice information 525 indicates Network Slice Selection Assistance Information (NSSAI), Slice/Service Types (SST), Slice Differentiator (SDs), quality-of-service levels, operating system container parameters and/or some other slice information. The quality-of-service levels may specify data throughput, data latency, error rate, and the like. The operating system container parameters may specify data Central Processing Unit (CPU) occupancy, memory resources, Input/Output (I/O) capability and/or some other container features.

Smart contract 522 generates IPFS ID 524 from the content of slice information 525. Smart contract 522 obtains consensus on IPFS ID 524 and slice information 525 for UE 503 from distributed ledger nodes 521. Smart contract 522 stores IPFS ID 524 and slice information 525 in ledger block 523. Smart contract 522 stores the data from any previous blocks in block hash 526—if any previous ledger blocks exist.

Smart contract 522 encrypts IPFS ID 524 with the network key. In some examples, smart contract 522 transfers encrypted IPFS ID 524 to UE 503 over AMF 507 and 5GNR AN 504. In other examples, smart contract 522 transfers encrypted IPFS ID 524 to UE 503 over AMF 507, IWF 506 and WIFI AN 505. AMF 507 may transfer encrypted IPFS ID 524 to UE 503 in a Non-Access Stratum (NAS) file over an N1 link that traverses 5GNR AN 504 or the combination of IWF 506 and WIFI AN 505. UE 503 decrypts encrypted IPFS ID 524 with its UE key that is paired with the network key.

When UE 503 determines that the wireless data service is required, UE 503 encrypts IPFS 503 with the UE key and transfers encrypted IPFS ID 524 to smart contract 522 over 5GNR AN 504 and AMF 507 or over WIFI AN 505, IWF 506, and AMF 507. UE 503 may transfer encrypted IPFS ID 524 to AMF 507 in a NAS file over the N1 link. Smart contract 522 decrypts encrypted IPFS ID 524 with the network key that is paired with the UE key. Smart contract 522 obtains slice information 525 based on IPFS ID 524 which shares ledger block 523 with slice information 525. Smart contract 522 transfers slice information 525 to AMF 507.

AMF 507 selects network slice 509 based on slice information 525 and indicates network slice 509 and transfers slice information 525 to SMF 508. SMF 508 selects UPF 510 based on network slice 509 and slice information 525. SMF 508 directs UPF 510 to serve UE 503 based on slice information 525. In particular, SMF 508 directs UPF 510 to signal the operating system in data center 530 that executes UPF 510 to use operating system container properties that are indicated by slice information 525. SMF 508 also directs UPF 510 to use quality-of-service levels indicated by slice information 525. AMF 507 directs either 5GNR AN 504 or IWF 506 to serve UE 503 based on slice information 525. In particular, AMF 507 directs 5GNR AN 504 or IWF 506 use the quality-of-service levels indicated by slice information 525. AMF 507 directs UE 503 to use the quality-of-service levels indicated by slice information 525. UE 503 exchanges user data with an external system (not shown) over slice 509 (UPF 510) using 5GNR AN 505 or WIFI AN 505 and IWF 506.

In a similar manner slice information 525, smart contract 522 may transfer software, non-fungible tokens, media, enterprise virtual states, or other items to UE 503. For example, smart contract 522 may store a non-fungible token for UE 503 in association with IPFS ID 524 instead of storing slice information 525. Smart contract 522 may then transfer the non-fungible token to UE 503 in response to receiving encrypted IPFS ID 524 as described above for slice information 525. In some examples a Network Slice Selection Function (NSSF) or a Network Exposure Function (NEF) hosts smart contract 522, and IPFS ID 524 indicates that NSSF or NEF.

In some examples, a series of different IPFS IDs may be generated from a series of changing slice information, and the series of IPFS IDs and slice information could be stored in a series of ledger blocks that form an association between all of the IPFS IDs and slice information. For example, the smart contract could add slice usage data to modify slice information 525 and generate a new IPFS ID based on the modified slice information. The new IPFS ID could be issued to the user used to access the wireless data service over the wireless network slice. Ledger block hash 526 would record this usage history for the user of the wireless network slice and could be used for accounting.

Figure 6:
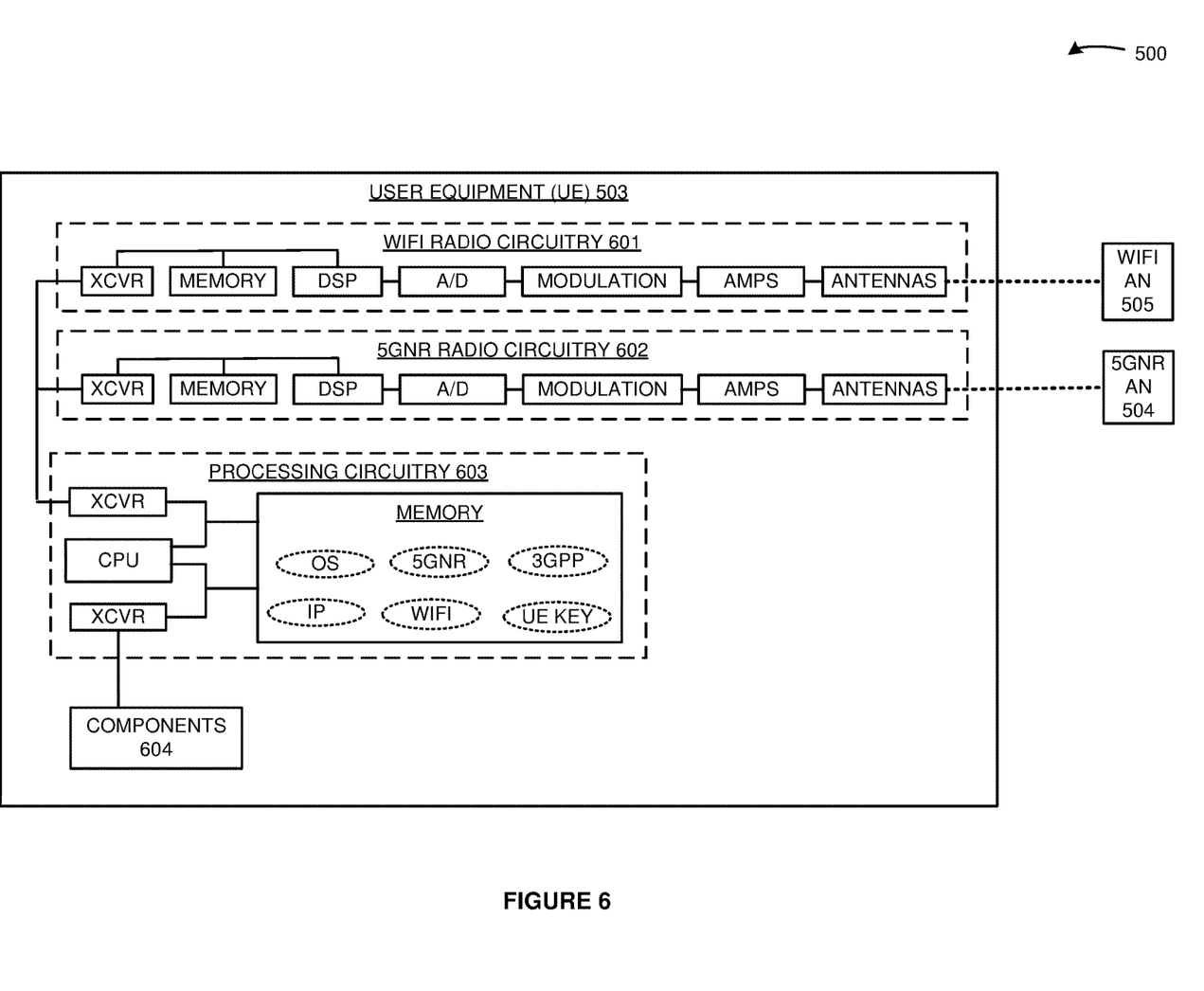
FIG. 6 illustrates an exemplary UE in the wireless communication network that delivers the wireless data service to the wireless UE using an IPFS ID.

FIG. 6 illustrates exemplary UE 503 in wireless communication network 500 that delivers the wireless data service using IPFS ID 524. UE 503 comprises an example of wireless communication device 101 and UEs 501-502, although device 101 and UEs 502-503 may differ. UE 503 comprises WIFI radio circuitry 601, 5GNR radio circuitry 602, processing circuitry 603, and components 604. Components 604 comprise sensors, cameras, medical devices, and/or some other user apparatus. Radios 601-602 comprise antennas, amplifiers, filters, modulation, analog-to-digital interfaces, DSPs, memories, and transceivers (XCVRs) that are coupled over bus circuitry. Processing circuitry 603 comprises one or more CPUs, one or more memories, and one or more transceivers that are coupled over bus circuitry. The one or more memories in processing circuitry 603 store a UE key and software like an Operating System (OS), 5GNR application (5GNR), 3GPP application (3GPP), Internet Protocol application (IP), and WIFI application (WIFI). The antennas in WIFI radio circuitry 601 exchange WIFI signals with WIFI AN 505. The antennas in 5GNR radio circuitry 602 exchange 5GNR signals with 5GNR AN 504. Transceivers in radios 601-602 are coupled to transceivers in processing circuitry 603. In processing circuitry 603, the one or more CPUs retrieve the software from the one or more memories and execute the software to direct the operation of UE 503 as described herein.

In particular, radios 601-602 wirelessly receives encrypted IPFS ID 524 that was transferred by smart contract 522 for delivery to UE 503. Processing circuitry 603 decrypts encrypted IPFS ID 524 with its UE key. When the wireless data service is required, processing circuitry 603 encrypts IPFS ID 524 with the UE key and radios 601-602 wirelessly transfer encrypted IPFS ID 524 for delivery to smart contract 522. UE 503 may receive and transfer IPFS ID 524 in a NAS file over an N1 link. UE 503 uses the QoS levels indicated by slice information 525. UEs 501-502 could be configured and operate like UE 503 where UE 501 uses 5GNR AN 504 and UE 502 uses WIFI AN 505. UEs 501-502 could have different UE keys and use different slices than UE 503.

Figure 7:
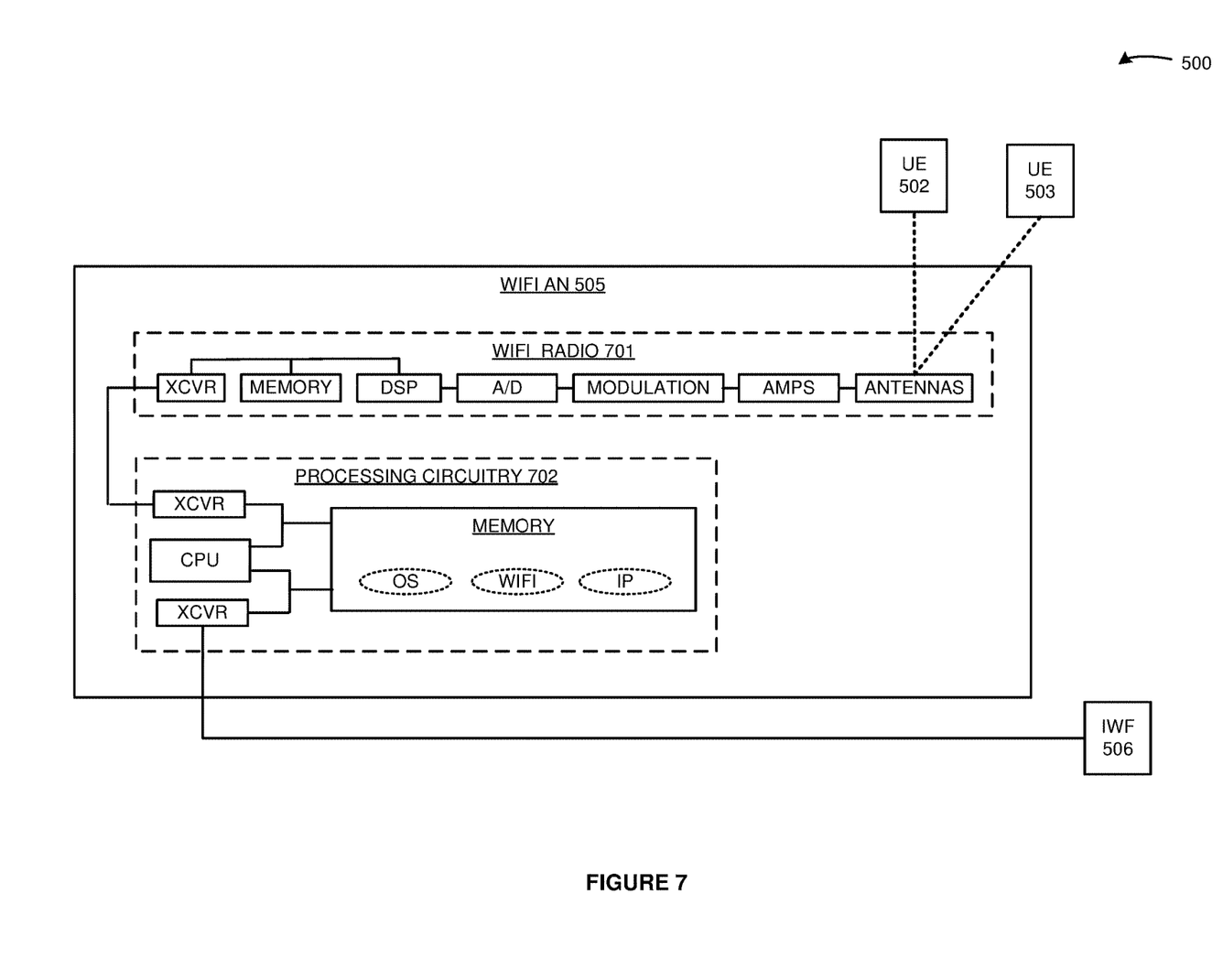
FIG. 7 illustrates an exemplary WIFI access node in the wireless communication network to deliver the wireless data service to the wireless UEs using the IPFS IDs.

FIG. 7 illustrates exemplary WIFI access node 505 in wireless communication network 500 to deliver the wireless data service to wireless UEs 502-503 using IPFS IDs. WIFI AN 505 comprises an example of communication circuitry 111, although circuitry 111 may differ. WIFI AN 505 comprises WIFI radio 701 and processing circuitry 702. Radio 701 comprises antennas, amplifiers, filters, modulation, analog-to-digital interfaces, DSPs, memories, and transceivers that are coupled over bus circuitry. Processing circuitry 702 comprises one or more CPUs, one or more memories, and one or more transceivers that are coupled over bus circuitry. The one or more memories in processing circuitry 702 store software like an Operating System, WIFI application, and IP application. The antennas in WIFI radio 701 exchange WIFI signals with UEs 502-503. Transceivers in radio 701 are coupled to transceivers in processing circuitry 702. Transceivers in processing circuitry 702 are coupled to transceivers in IWF 506. In processing circuitry 702, the one or more CPUs retrieve the software from the one or more memories and execute the software to direct the operation of WIFI AN 505 as described herein.

Figure 8:
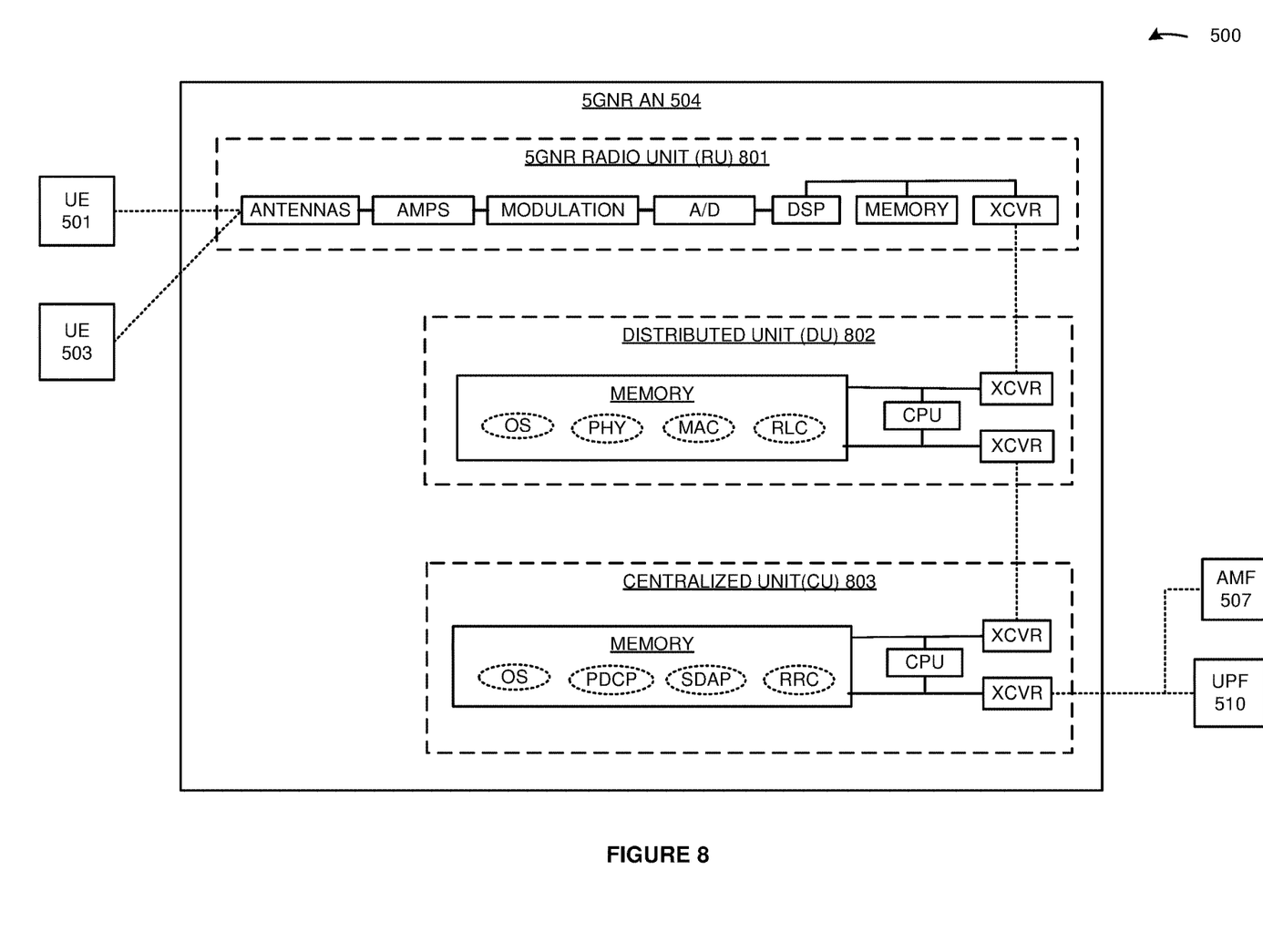
FIG. 8 illustrates an exemplary Fifth Generation New Radio (5GNR) access node in the wireless communication network to deliver the wireless data service to the wireless UEs using the IPFS IDs.

FIG. 8 illustrates exemplary Fifth Generation New Radio (5GNR) Access Node (AN) in wireless communication network 500 to deliver the wireless data service to wireless UEs 501 and 503 using the IPFS IDs. 5GNR AN 504 comprises an example of communication circuitry 111, although circuitry 111 may differ. 5GNR AN 504 comprises 5GNR Radio Unit (RU) 801, Distributed Unit (DU) 802, and Centralized Unit (CU) 803. 5GNR RU 801 comprises antennas, amplifiers, filters, modulation, analog-to-digital interfaces, DSP, memory, radio applications, and transceivers that are coupled over bus circuitry. DU 802 comprises memory, CPU, user interfaces and components, and transceivers that are coupled over bus circuitry. The memory in DU 802 stores operating system and 5GNR network applications for Physical Layer (PHY), Media Access Control (MAC), and Radio Link Control (RLC). CU 803 comprises memory, CPU, and transceivers that are coupled over bus circuitry. The memory in CU 803 stores an operating system and 5GNR network applications for Packet Data Convergence Protocol (PDCP), Service Data Adaption Protocol (SDAP), and Radio Resource Control (RRC). The antennas in 5GNR RU 801 are wirelessly coupled to UE 501 and UE 503 over 5GNR links. Transceivers in 5GNR RU 801 are coupled to transceivers in DU 802. Transceivers in DU 802 are coupled to transceivers in CU 803. Transceivers in CU 803 are coupled to AMF 507 and UPF 512. The DSP and CPU in RU 701, DU 702, and CU 703 execute the radio applications, operating systems, and network applications to exchange data and signaling with UE 501, UE 503, AMF 507, and UPF 512 as described herein. In particular, 5GNR AN 504 serves UEs 501 and 503 based on quality of service levels indicated by slice information 525.

Figure 9:
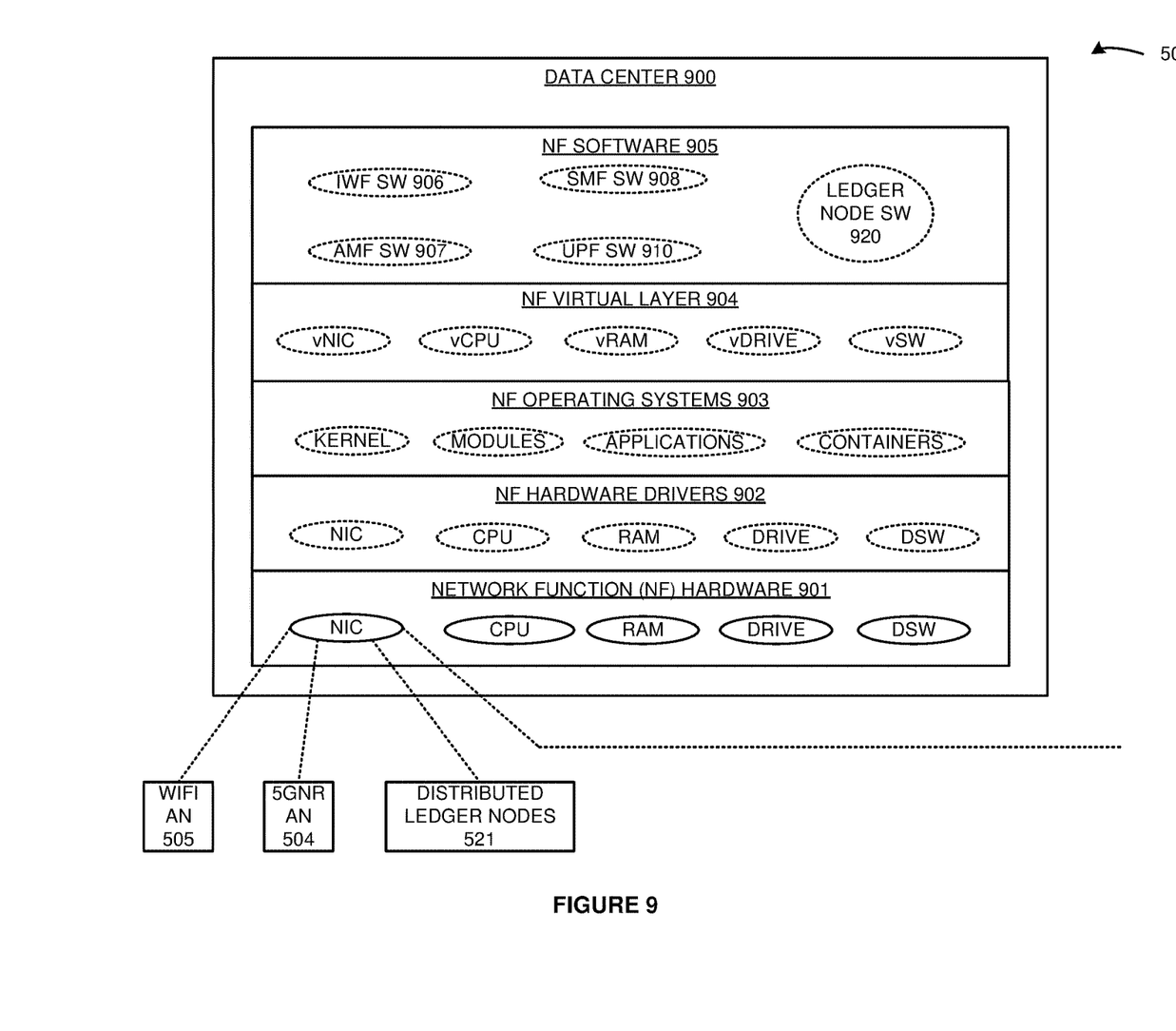
FIG. 9 illustrates an exemplary data center in the wireless communication network to deliver the wireless data service to the wireless UEs using the IPFS IDs.

FIG. 9 illustrates exemplary data center 530 in wireless communication network 500 to deliver the wireless data service to wireless UEs 501-503 using the IPFS IDs. Data center 530 comprises an example of circuitry 111-113 and circuitry 400, although circuitry 111-113 and circuitry 400 may differ. Data center 530 comprises NF hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, applications, and containers. NF virtual layer 904 comprises vNIC, vCPU, vRAM, vDRIVE, and vSW. NF SW 905 comprises IWF SW 906, AMF SW 907, SMF SW 908, UPF SW 910, and ledger node SW 920. The NIC in NF hardware 901 are coupled to 5GNR AN 504, WIFI AN 505, and external systems. NF hardware 901 executes NF hardware drivers 902, NF operating systems 903, NF virtual layer 904, and NF SW 905 to form and operate IWF 506, AMF 507, SMF 508, UDM 510, and ledger node 520. The drives in NF hardware 901 comprise the memory for ledger node SW 920. NF operating system 903 uses container properties indicated by slice information 525, and either SMF SW 908 or UPF SW 909 signals these container properties to NF operating systems 903. Thus, data center 530 comprises one or more microprocessors and one or more non-transitory machine-readable storage media that store processing instructions that direct data center 530 to perform the methods described herein. Network data center 530 may be located at a single site or be distributed across multiple geographic locations.

In operation, ledger node SW 920 receives slice information 525 for UE 503 from network operations (not shown). Ledger node SW 920 generates IPFS ID 524 from the content of slice information 525. Ledger node SW 920 obtains consensus on IPFS ID 524 and slice information 525 for UE 503 from distributed ledger nodes 521. Ledger node SW 920 stores IPFS ID 524 and slice information 525 in ledger block 523. Ledger node SW 920 stores the data from previous blocks in block hash 526 (if any previous ledger blocks exist).

Ledger node SW 920 encrypts IPFS ID 524 with the network key. In some examples, ledger node SW 920 transfers encrypted IPFS ID 524 to UE 503 over AMF SW 907 and 5GNR AN 504. In other examples, ledger node SW 920 transfers encrypted IPFS ID 524 to UE 503 over AMF SW 907, IWF SW 906 and WIFI AN 505. AMF SW 907 may transfer encrypted IPFS ID 524 to UE 503 in a NAS file over an N1 link that traverses 5GNR AN 504 or the combination of IWF SW 906 and WIFI AN 505. UE 503 transfers encrypted IPFS ID 524 to ledger node SW 920 over 5GNR AN 504 and AMF SW 907 or over WIFI AN 505, IWF SW 906, and AMF SW 907. UE 503 may transfer encrypted IPFS ID 524 to AMF SW 907 in a NAS file over the N1 link. Ledger node SW 920 decrypts encrypted IPFS ID 524 with the network key that is paired with the UE key. Ledger node SW 920 obtains slice information 525 based on IPFS ID 524 which shares ledger block 523 with slice information 525. Ledger node SW 920 transfers slice information 525 to AMF SW 907.

AMF SW 907 selects network slice 509 based on slice information 525 and indicates network slice 509 and slice information 525 to SMF SW 908. SMF SW 908 selects UPF SW 910 based on network slice 509 and slice information 525. SMF SW 908 directs UPF SW 910 to serve UE 503 based on slice information 525. In particular, SMF SW 908 directs UPF SW 910 to signal NF operating systems 903 that executes UPF SW 910 to use operating system container properties that are indicated by slice information 525. SMF SW 908 also directs UPF SW 910 to use quality-of-service levels indicated by slice information 525. AMF SW 907 directs either 5GNR AN 504 or IWF SW 906 to serve UE 503 based on slice information 525. In particular, AMF SW 907 directs 5GNR AN 504 or IWF SW 906 use the quality-of-service levels indicated by slice information 525. AMF SW 907 directs UE 503 to use the quality-of-service levels indicated by slice information 525. UE 503 exchanges user data with an external system (not shown) over slice 509 (UPF SW 910) using 5GNR AN 505 or WIFI AN 505 and IWF SW 906.

In a similar manner slice information 525, ledger node SW 920 may transfer software, non-fungible tokens, media, enterprise virtual states, or other items to UE 503. For example, ledger node SW 920 may store a non-fungible token for UE 503 in association with IPFS ID 524 instead of storing slice information 525. Ledger node SW 920 may then transfer the non-fungible token to UE 503 in response to receiving encrypted IPFS ID 524 as described above for slice information 525. In some examples Network Slice Selection Function (NSSF) SW or Network Exposure Function (NEF) SW hosts ledger node SW 920, and IPFS ID 524 indicates that NSSF or NEF.

Figure 10:
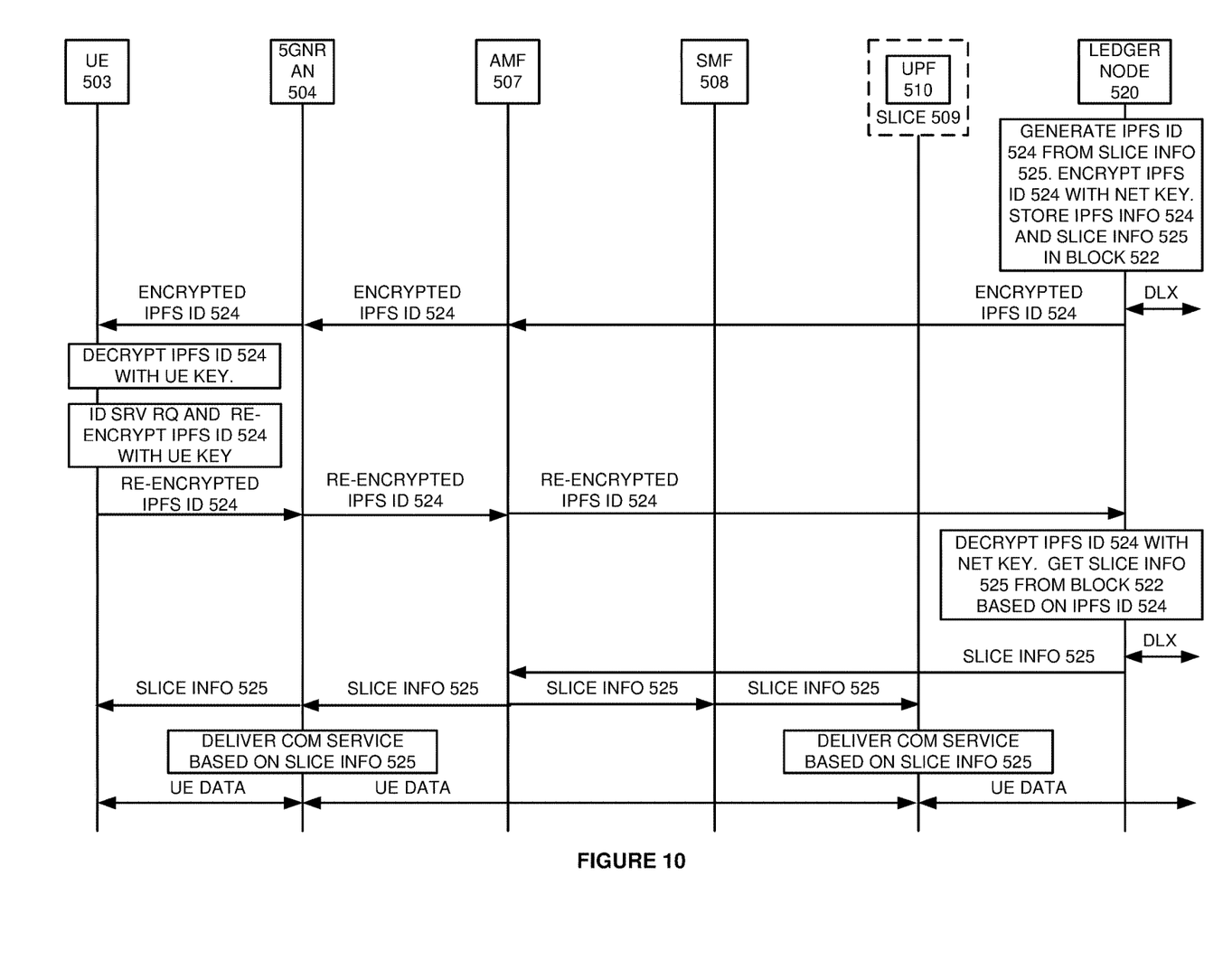
FIG. 10 illustrates an exemplary operation of the wireless communication network to deliver the wireless data service to a wireless UE using an IPFS ID.

FIG. 10 illustrates an exemplary operation of wireless communication network 500 to deliver the wireless data service to wireless UE 503 using IPFS ID 524. The operation may differ in other examples. Distributed ledger node 520 generates IPFS ID 524 from slice information 525. Distributed ledger node 520 obtains consensus (DLX) on IPFS ID 524 and slice information 525 for UE 503 from distributed ledger nodes 521 (not shown on FIG. 10). Distributed ledger node 520 stores IPFS ID 524 and slice information 525 in ledger block 523. Distributed ledger node 520 encrypts IPFS ID 524 with the network key. Distributed ledger node 520 transfers encrypted IPFS ID 524 to UE 503 over AMF 507 and 5GNR AN 504. UE 503 decrypts encrypted IPFS ID 524 with its UE key.

When UE 503 determines that the wireless data service is required (ID SRV RQ), UE 503 encrypts IPFS 503 with the UE key and transfers encrypted IPFS ID 524 to distributed ledger node 520 over 5GNR AN 504 and AMF 507. Distributed ledger node 520 decrypts encrypted IPFS ID 524 with the network key. Distributed ledger node 520 obtains slice information 525 based on IPFS ID 524 which shares ledger block 523 with slice information 525. Distributed ledger node 520 obtains consensus from ledger nodes 521 on slice information 525 for UE 503. Distributed ledger node 520 transfers slice information 525 to AMF 507.

AMF 507 selects network slice 509 based on slice information 525 and indicates network slice 509 and slice information 525 to SMF 508. SMF 508 selects UPF 510 based on network slice 509 and slice information 525. SMF 509 directs UPF 510 in selected slice 509 to serve UE 503 based on slice information 525. AMF 507 directs 5GNR AN 504 to serve UE 503 based on slice information 525 and the quality-of-service levels therein. AMF 507 directs UE 503 to use the quality-of-service levels indicated by slice information 525. 5GNR AN 504 and UPF 510 deliver the wireless data service to UE 503 based on slice information 525. UE 503 exchanges UE data with an external system (not shown) over 5GNR AN 505 and UPF 510 per slice information 525.

The wireless communication system circuitry described above comprises computer hardware and software that form special-purpose data communication circuitry to deliver a wireless data service to a wireless communication device using content-addressing. The computer hardware comprises processing circuitry like CPUs, DSPs, GPUs, transceivers, bus circuitry, and memory. To form these computer hardware structures, semiconductors like silicon or germanium are positively and negatively doped to form transistors.

The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to deliver the wireless data service to the wireless communication device using content-addressing.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to deliver a wireless data service to a wireless communication device using content-addressing, the method comprising:
   generating a content-address from a data set and storing the content-address in association with the data set;
   encrypting the content-address with a system key and transferring the encrypted content-address to the wireless communication device, wherein the wireless communication device decrypts the encrypted content-address with a user key to obtain the content address;
   receiving a re-encrypted content-address from the wireless communication device and decrypting the re-encrypted content-address with the system key to obtain the content-address, wherein the wireless communication device re-encrypted the content-address with the user key;
   retrieving the data set with the decrypted content-address; and
   delivering the wireless data service to the wireless communication device based on the retrieved data set.

2. The method of claim 1 wherein the data set comprises wireless network slice information for the wireless communication service delivered to the wireless communication device.

3. The method of claim 1 wherein the data set comprises operating system container properties for the wireless data service delivered to the wireless communication device.

4. The method of claim 1 wherein the data set comprises:
   wireless network slice information for the wireless communication service delivered to the wireless communication device; and
   operating system container properties for the wireless data service delivered to the wireless communication device.

5. The method of claim 1 wherein generating the content-address from the data set comprises generating an Inter-Planetary File System Identifier (IPFS ID) from the data set.

6. The method of claim 1 wherein generating the content-address from the data set comprises a smart contract in a distributed ledger generating the content-address from the data set.

7. The method of claim 1 wherein storing the content-address in association with the data set comprises a distributed ledger storing the content-address in association with the data set.

8. The method of claim 1 wherein the data set comprises wireless network slice information for the wireless data service delivered to the wireless communication device.

9. The method of claim 1 wherein the data set comprises operating system container properties for the wireless data service delivered to the wireless communication device.

10. The method of claim 1 wherein the data set comprises:
    wireless network slice information for the wireless data service delivered to the wireless communication device; and
    operating system container properties for the wireless data service delivered to the wireless communication device.

11. The method of claim 1 wherein the content-address comprises an Inter-Planetary File System Identifier (IPFS ID).

12. The method of claim 1 wherein the processing circuitry comprises a distributed ledger smart contract.

13. The method of claim 1 wherein the communication circuitry comprises a wireless network slice.

14. A method to deliver a wireless data service to a wireless communication device using an Inter-Planetary File System Identifier (IPFS ID), the method comprising:
    generating the IPFS ID from wireless network slice information and storing the IPFS ID in association with the wireless network slice information;
    encrypting the IPFS ID with a system key and transferring the encrypted IPFS ID to the wireless communication device, wherein the wireless communication device decrypts the encrypted IPFS ID with a user key to obtain the IPFS ID;
    receiving a re-encrypted IPFS ID from the wireless communication device and decrypting the re-encrypted IPFS ID with the system key to obtain the IPFS ID, wherein the wireless communication device encrypted the IPFS ID with the user key;
    retrieving the wireless network slice information with the decrypted IPFS ID; and
    delivering the wireless data service to the wireless communication device based on the retrieved wireless network slice information.

15. The method of claim 14 wherein generating the Inter-Planetary File System Identifier (IPFS ID) from the wireless network slice information comprises a smart contract in a distributed ledger generating the IPFS ID from the wireless network slice information.

16. The method of claim 14 wherein storing the IPFS ID in association with the wireless network slice information comprises a distributed ledger storing the IPFS ID in association with the wireless network slice data set in a distributed ledger.

17. The method of claim 14 wherein encrypting the IPFS ID with the system key and decrypting the re-encrypted IPFS ID with the system key comprises a smart contract in a distributed ledger encrypting the IPFS ID with the system key and decrypting the re-encrypted IPFS ID with the system key.

18. The method of claim 14 wherein the wireless network slice information comprises operating system container properties.

19. The method of claim 14 wherein the wireless network slice information comprises quality-of-service parameters for the wireless data service.

20. A wireless communication system to deliver a wireless data service to a wireless communication device using content-addressing, the wireless communication system comprising:

processing circuitry to generate a content-address from a data set;

memory circuitry to store the content-address in association with the data set;

the processing circuitry to encrypt the content-address with a system key and transfer the encrypted content-address to the wireless communication device, wherein the wireless communication device is to decrypt the encrypted content-address with a user key to obtain the content address;

the processing circuitry to receive a re-encrypted content-address from the wireless communication device and decrypt the re-encrypted content-address with the system key to obtain the content-address, wherein the wireless communication device is to re-encrypt the content-address with the user key;

the processing circuitry to retrieve the data set from the memory circuitry with the decrypted content-address; and communication circuitry to deliver the wireless data service to the wireless communication device based on the retrieved data set.

\* \* \* \* \*